Patented Oct. 17, 1950

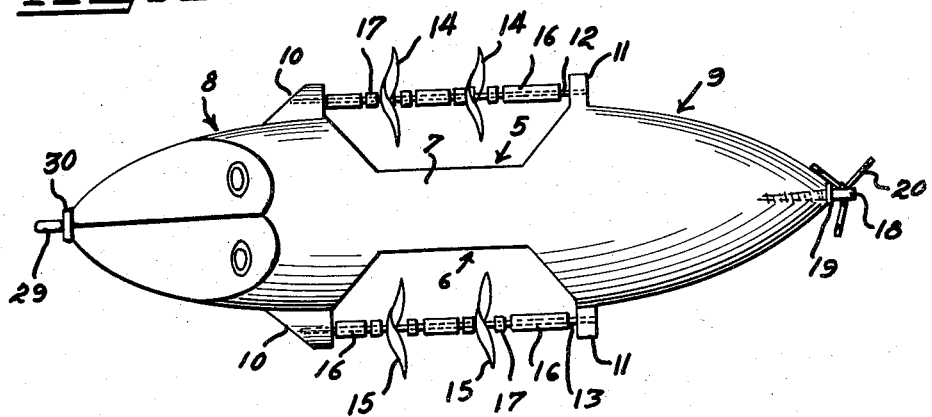
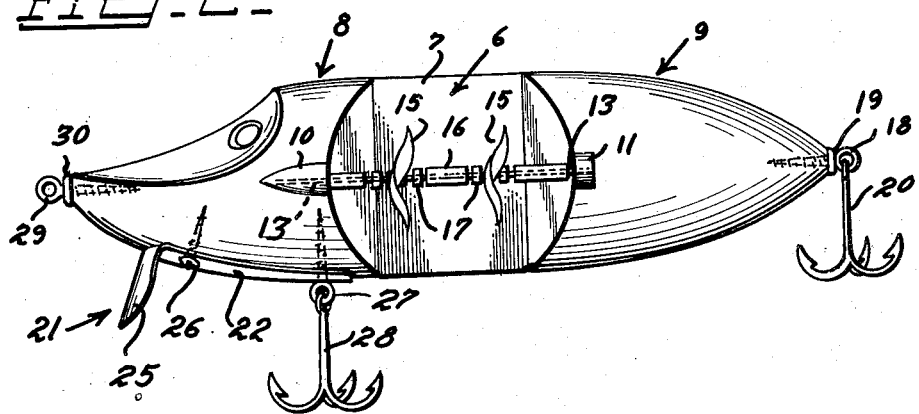
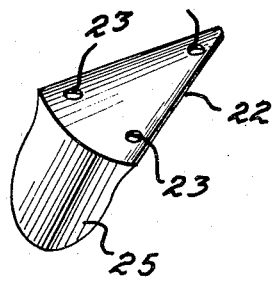

2,526,077

UNITED STATES PATENT OFFICE 2,526,077

FISHING LURE

Frank Jurczak, Ambridge, Pa.

Application September 21, 1946, Serial No. 698,472

2 Claims. (Cl. 43—42.12)

The present invention relates to artificial fish baits and lures such as are used by anglers employing common methods of fishing known as bait casting and trolling.

Briefly, the preferred embodiment of the invention comprises a substantially buoyant body of wood, plastic or equivalent material, the same being of a desired size and of a predetermined shape and intended to delude and entice fish, the intermediate portion of the body being provided, on substantially diametrically opposite sides, with free idling spinners and there being suitably attached fishing hooks and a wabble-type spoon on the underside of the nose portion of said body, the latter serving to impart, when drawn through the water, life-like swimming motions to said body.

An important object of the invention is to provide a simple and expedient lure of the aforementioned type which is adequately designed and shaped to attain desired results and which embodies diametrically opposite side notches defining definite front and rear portions, said notches being bridged by fixedly mounted horizontal and substantially parallel shafts, the shafts serving as supports for the aforementioned free running spinners.

Another object of the invention has to do with the external and surface shaping of the forward or front portion of the body, this being fashioned to resemble a fish and carrying, on its underside, the aforementioned wabble and wobble producing spoon or baffle.

Other objects, features and advantages will become more readily apparent from the following description and the accompanying illustrative drawing.

In the drawings, wherein like numerals are employed to designate like parts throughout the views:

Figure 1 is a top plan view of a fishing lure constructed in accordance with the specific principles of the instant invention;

Figure 2 is a side elevational view of the same; and,

Figure 3 is a perspective view of the wobble motion producing spoon.

Referring now to the drawings by distinguishing reference numerals, it will be seen that the body is of appropriate length and, as before stated, of suitable wood, plastic or other material. It is of general dirigible-shaped form in lengthwise appearance. Diametrically opposite side portions of the median part of the body are formed with bevel-ended notches 5 and 6, said notches defining a relatively narrow rectangular mid-portion 7 and front and rear end portions 8 and 9. The portions 8 and 9 are of general bullet-shaped configuration and are properly proportioned and balanced in relation to the narrowed portion 7. The front portion 8 is provided with diametrically opposite outstanding projections 10 which are suitably streamlined as shown in Figure 2 and which constitute rudder-like balancing and stabilizing fins. Similar diametrically opposite projections 11 are provided on the fore-end of the rear portion 9. The projections 10 and 11 are in proper longitudinal alignment, considered in pair relation, and are at opposite beveled ends of the aforementioned notches 5 and 6. They are suitably bored to provide bearings for end-portions of the opposite parallel shaft-forming rods 12 and 13. These rods as will be noted span or bridge the adjacent notches and are in positions outwardly of the exterior main surfaces of the body, as a unit. At this point I desire to stress the manner in which the shaft-forming rods are mounted. That is to say, the rod 12 is on one side as shown in Figure 1 and the rod 13 on the other side. The forward end of each rod is of needle-like form and telescopes into the socket or bore provided therefor in the associated forward projection 10. There are pairs of spinners 14 and 15 mounted on the intermediate portions of the respective rods, after the rods are anchored in place, and the spinners serve as propellers and in use represent twirling fins.

It is of moment to bring out the fact that each spinner assembly is in the same and is mounted in the same manner. To accomplish this the pointed end of the rod, either rod 12 or 13, is passed forwardly through the bore in the rear projection 11 and is held in slight spaced relation from the projection 10 so as to permit the parts to be strung on the rod before the rod is finally anchored in place. The attachments are then placed on the rod or shaft. That is to say, first I place a spacer on the pointed end of the rod, then a washer, then a spinner and repeat this order until the rod is loaded. Then, the needle end of the rod is forced into the socket provided for same in the forward projection 10. It will be seen that the spinner and rod assemblies are thus novel from the standpoint of assembling and mounting.

A screw-eye 18 is mounted in the rear or tail portion and provided with a cap-like washer 19 which is held in place by the eye 18 and which serves as a tail protector. The eye 18 serves primarily as a support for the multiple pronged rear hook, that is the fishing hook 20.

Referring now to the wobble producing spoon, this is denoted by the numeral 21 and is of somewhat conventional type. It includes a substantially triangular shank 22 having screw holes 23 and 24 as shown in Figure 3. The downbent front end, forming a concavo-convex baffle plate, is denoted by the numeral 25 and is shaped and proportioned to produce the desired resistance and consequently appropriate wobbling of the lure when drawn through the water. The shank 22 conforms to and is fastened against the under or belly portion of the front part 8. The screws 26 pass through the holes 23 and into the body whereas a screw eye 27 passes through the hole 24 and into the body and serves as appropriate attaching means for the front fishing hook 28.

Another screw eye is employed and this is in the nose and is denoted by the numeral 29, the shank carrying a cupped washer 30 to suitably cap over the nose.

In bait casting, a line is attached to the eyescrew 29 in the nose of the lure, and the lure is cast out and retrieved, and, as it is being reeled in, the resistance of the spoon 25 activates the plug or body and imparts to it a wobbly motion, simulating a swimming fish. It will be noticed that the forward wings or projections are streamlined in design, so as not to retard too greatly this wobble action. At the same time, the resistance of the water against the propeller type spinners, mounted on the sides and free from conflict, causes said spinners to revolve freely simulating the movement of fins. The action of the lure can be varied by using a fast, slow, or jerk method of retrieving the lure, and in trolling at a set rate of speed an even motion is acquired. The lure has the added advantage of the revolving spinners to augment the darting or wobble action provided by the common bent lip spoon.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. In a fishing lure of the class shown and described wherein the lure includes a body and said body is provided on its forward underside with a depending angularly disposed baffle plate providing a wobble member for the body; said body being provided on opposite intermediate sides with duplicate notches, each notch opening outwardly through the corresponding side and also opening completely and without obstruction through dorsal and belly surfaces of the body, a longitudinally disposed rod supported horizontally on and outwardly of one side of the body in a plane intermediate the dorsal and belly portions, said rod spanning but lying outwardly of the notch, an identical rod on the diametrically opposite side of said body also outwardly of but spanning the adjacent notch and situated horizontally on a plane midway between the dorsal and belly portions of the body, said rods constituting shafts, and bladed spinners freely mounted for rotation on the respective shafts, said spinners revolving in planes at right angles to the longitudinal axis of said body, the paths of rotation of the blades of said spinners ranging partly within and partly outside of said notches.

2. A fishing line lure of the class shown and described comprising an elongated body provided at its forward end with a spoon embodying a downwardly directed concavo-convex baffle plate, the convex surface of said baffle plate facing forwardly in relation to the forward end of said body, a line accommodation eye on the forward end of said body, the diametrically opposite intermediate sides of said body being provided with duplicate notches, each notch opening outwardly through the corresponding side of the body and also opening completely and without obstruction through the respective dorsal and belly surfaces of the body, pairs of longitudinally aligned forward and rearward projections formed integrally with said body and situated at opposite forward and rearward ends of the respective notches, all of said projections projecting outwardly beyond the adjacent side surfaces of said body, the surfaces of the forward projections being provided with sockets and said sockets opening in rearward directions, the rearward projection being provided with bores opening through forward and rearward surfaces of the projections, said bores being in longitudinal alignment with said sockets, a rod having its forward end portion anchored in the socket in one forward projection and its rear end portion removably anchored in the bore in the corresponding rearward projection, a second rod corresponidng to the first-named rod and located on the opposite side of the body and having its forward end anchored in the corresponding forward projection and having its rearward end removably anchored in the bore in the remaining rearward projection, said projections and rods lying in horizontal planes mid-way between the dorsal and belly surfaces of the body and said rods spanning the notches in positions spaced outwardly from the respective notches, and bladed spinners mounted freely for rotation on the respective rods, the blades of the spinners revolving in paths of rotation at right angles to the longitudinal axis of said body.

FRANK JURCZAK.

REFERENCES CITED

The following references are of record in the file of this patent:

UNITED STATES PATENTS

| Number | Name | Date |
|---|---|---|
| 1,313,476 | Ewert | Aug. 19, 1919 |
| 1,842,127 | Stickel et al. | Jan. 19, 1932 |
| 1,869,111 | McLaughlin | July 26, 1932 |
| 2,204,552 | Singleton | June 18, 1940 |